(12) United States Patent
Aso

(10) Patent No.: US 11,583,943 B2
(45) Date of Patent: Feb. 21, 2023

(54) CUTTING INSERT AND CUTTING TOOL EQUIPPED THEREWITH

(71) Applicant: TUNGALOY CORPORATION, Fukushima (JP)

(72) Inventor: Takahiro Aso, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 0 days.

(21) Appl. No.: 17/411,848

(22) Filed: Aug. 25, 2021

(65) Prior Publication Data

US 2022/0105577 A1 Apr. 7, 2022

(30) Foreign Application Priority Data

Oct. 2, 2020 (JP) .............................. JP2020-167658

(51) Int. Cl.
*B23C 5/20* (2006.01)
*B23C 5/10* (2006.01)

(52) U.S. Cl.
CPC .............. *B23C 5/202* (2013.01); *B23C 5/109* (2013.01); *B23C 2200/08* (2013.01); *B23C 2210/0442* (2013.01)

(58) Field of Classification Search
CPC ......... B23C 2200/0411; B23C 2200/08; B23C 2200/085; B23C 2200/125;
(Continued)

(56) References Cited

U.S. PATENT DOCUMENTS 8,177,460 B2 * 5/2012 Satran .................. B23C 5/2213
407/66
9,776,258 B2 * 10/2017 Brunetto .................. B23C 5/06
(Continued)

FOREIGN PATENT DOCUMENTS

JP 2013-121639 A 6/2013
JP 6343016 B2 6/2018
(Continued)

*Primary Examiner* — Nicole N Ramos
(74) *Attorney, Agent, or Firm* — Studebaker & Brackett PC

(57) ABSTRACT

Provided is a cutting insert and a cutting tool equipped with the cutting tool improving the force to clamp the insert and improving the strength of the insert and the chip dischargeability. The cutting insert includes: an upper surface, which is a first end surface; a lower surface, which is a surface on an opposite side to the upper surface, and is a second end surface having an installing surface for installing a cutting tool; a screw hole which has an axial line penetrating from the upper surface to the lower surface; a peripheral side surface which is formed such that the upper surface and the lower surface are connected; a major cutting edge and an inner cutting edge which are formed in an intersecting region between the upper surface and the peripheral side surface, and an intersecting region between the lower surface and the peripheral side surface, respectively; and a constraining surface which is formed on the peripheral side surface so as to at least partially contact with a body. An angle of the major cutting edge and an angle of the constraining surface are different in a top view viewed from the upper surface, and the angle of the major cutting edge is smaller than the angle of the constraining surface.

7 Claims, 13 Drawing Sheets

(58) Field of Classification Search
CPC ........ B23C 2200/203; B23C 2200/293; B23C 2210/0442; B23C 5/109; B23C 5/202
See application file for complete search history.

(56) References Cited

U.S. PATENT DOCUMENTS

| | | | |
|---|---|---|---|
| 9,975,188 B2* | 5/2018 | Roman | B23C 5/06 |
| 10,010,952 B2* | 7/2018 | Mao | B23C 5/202 |
| 10,022,803 B2* | 7/2018 | Yamaguchi | B23B 27/145 |
| 2012/0009029 A1 | 1/2012 | Saji | |
| 2013/0129430 A1* | 5/2013 | Bhagath | B23B 27/145 |
| | | | 407/100 |
| 2013/0294850 A1* | 11/2013 | Park | B23C 5/06 |
| | | | 407/113 |
| 2014/0234037 A1 | 8/2014 | Horiike et al. | |
| 2014/0298967 A1* | 10/2014 | Ishi | B23C 5/202 |
| | | | 83/13 |
| 2017/0291231 A1 | 10/2017 | Mao | |
| 2019/0015910 A1* | 1/2019 | Mao | B23C 5/202 |
| 2019/0047059 A1* | 2/2019 | Shiroma | B23C 5/202 |
| 2019/0351492 A1* | 11/2019 | Shiroma | B23C 5/109 |

FOREIGN PATENT DOCUMENTS

| | | |
|---|---|---|
| WO | 2010/114094 A1 | 10/2010 |
| WO | 2013/051449 A1 | 4/2013 |

* cited by examiner

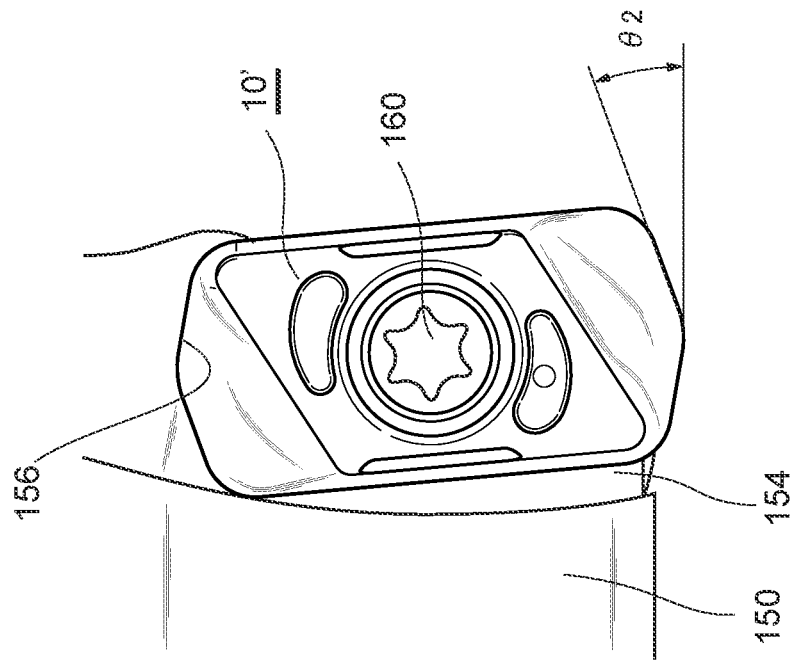
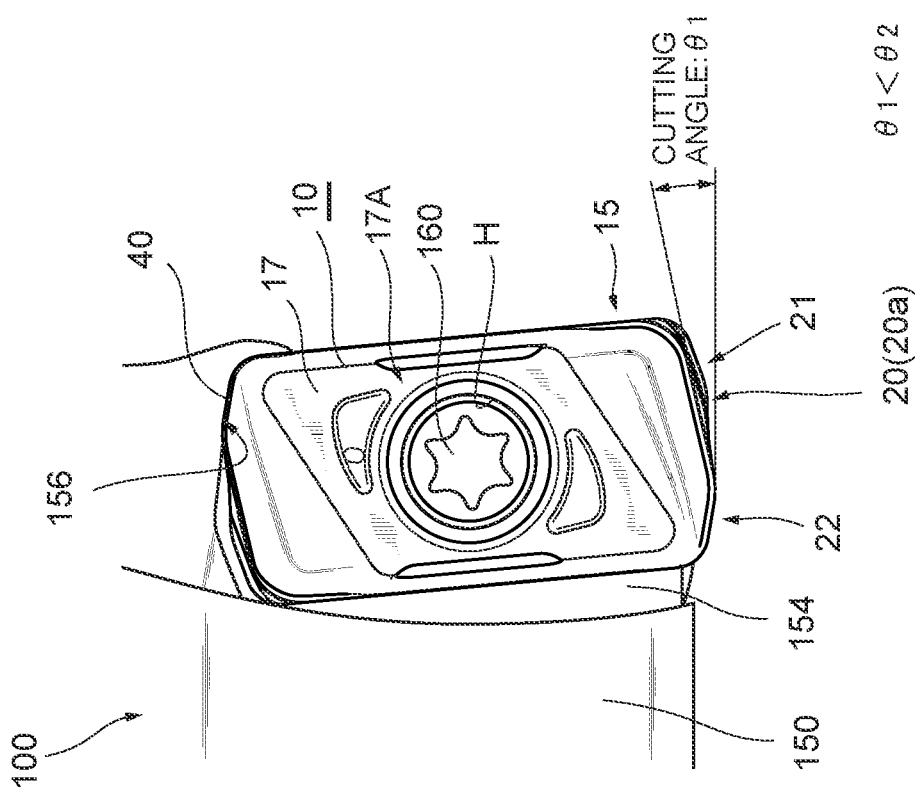

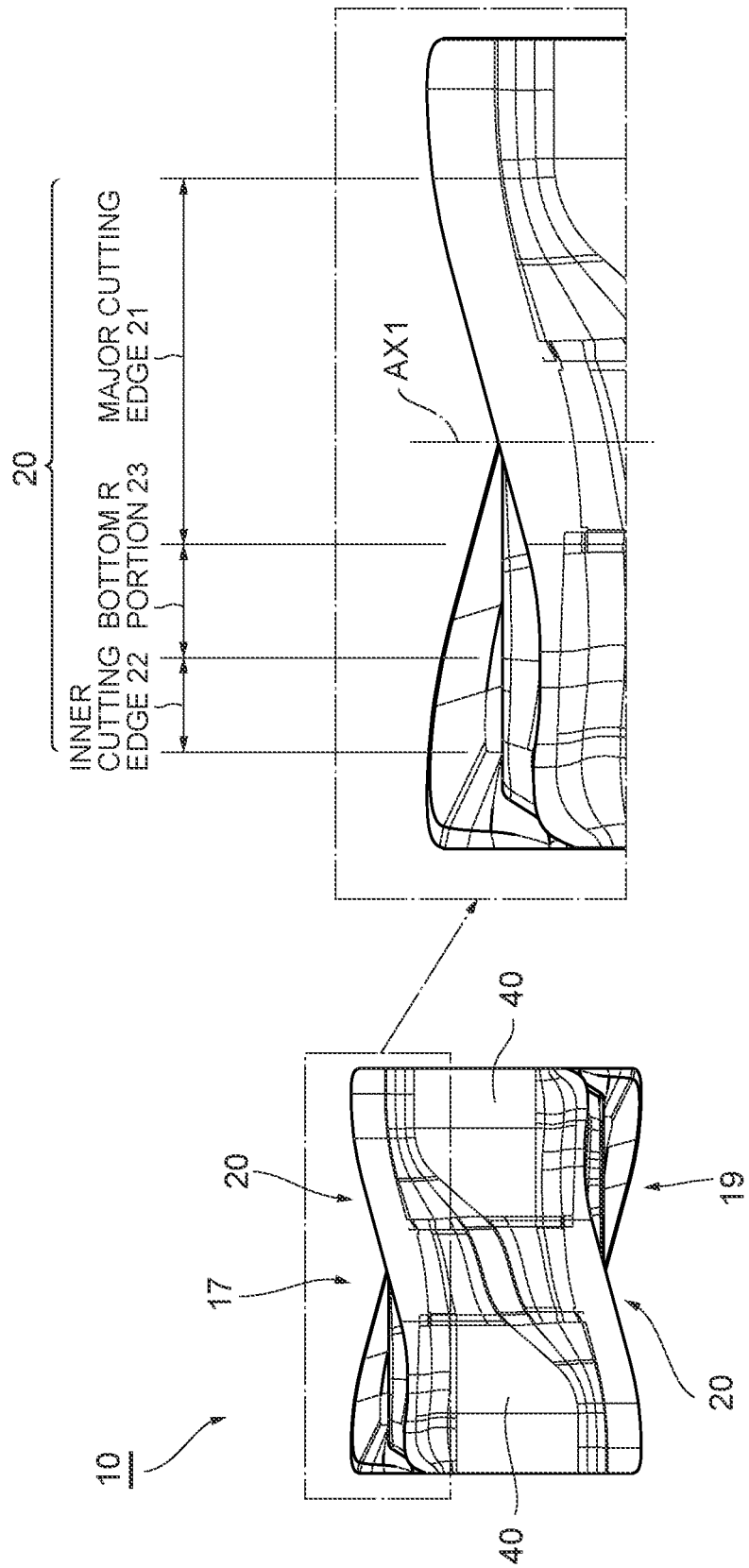

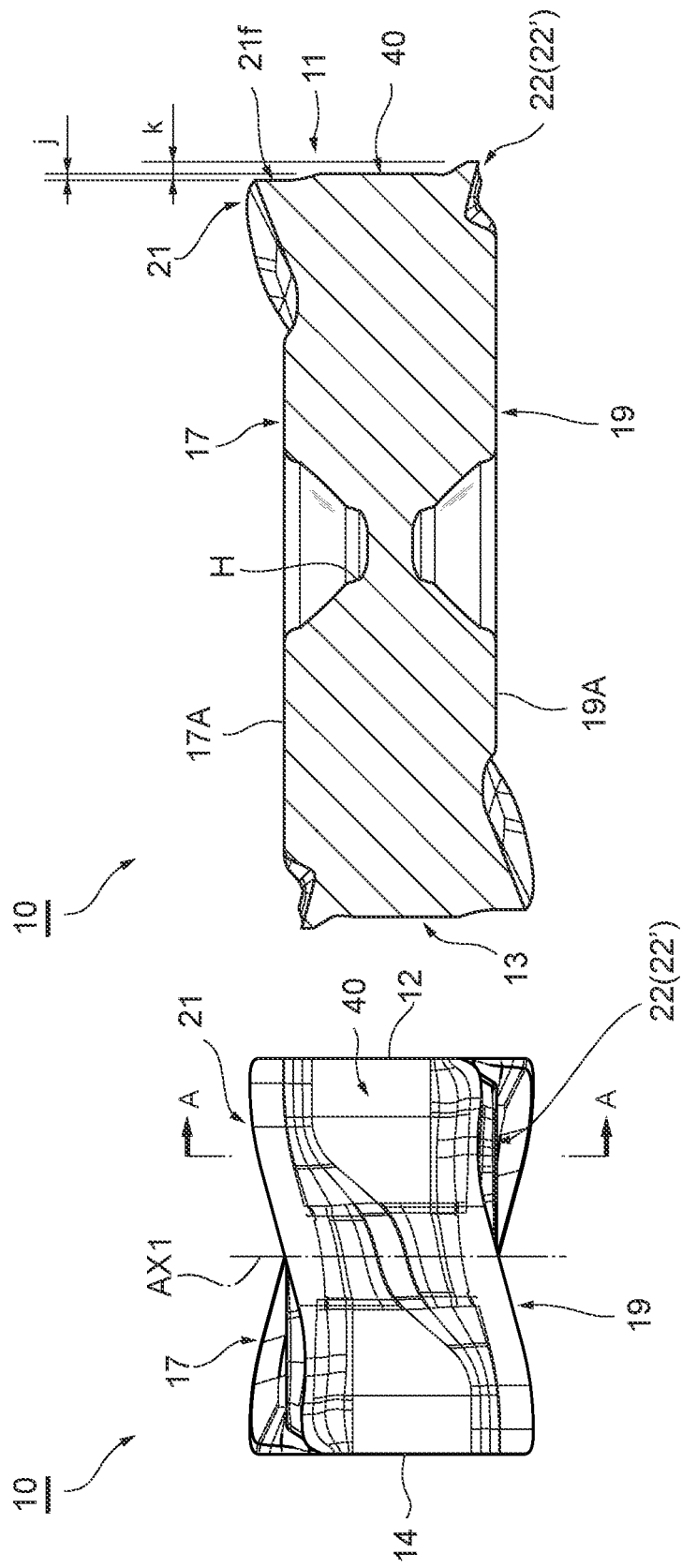

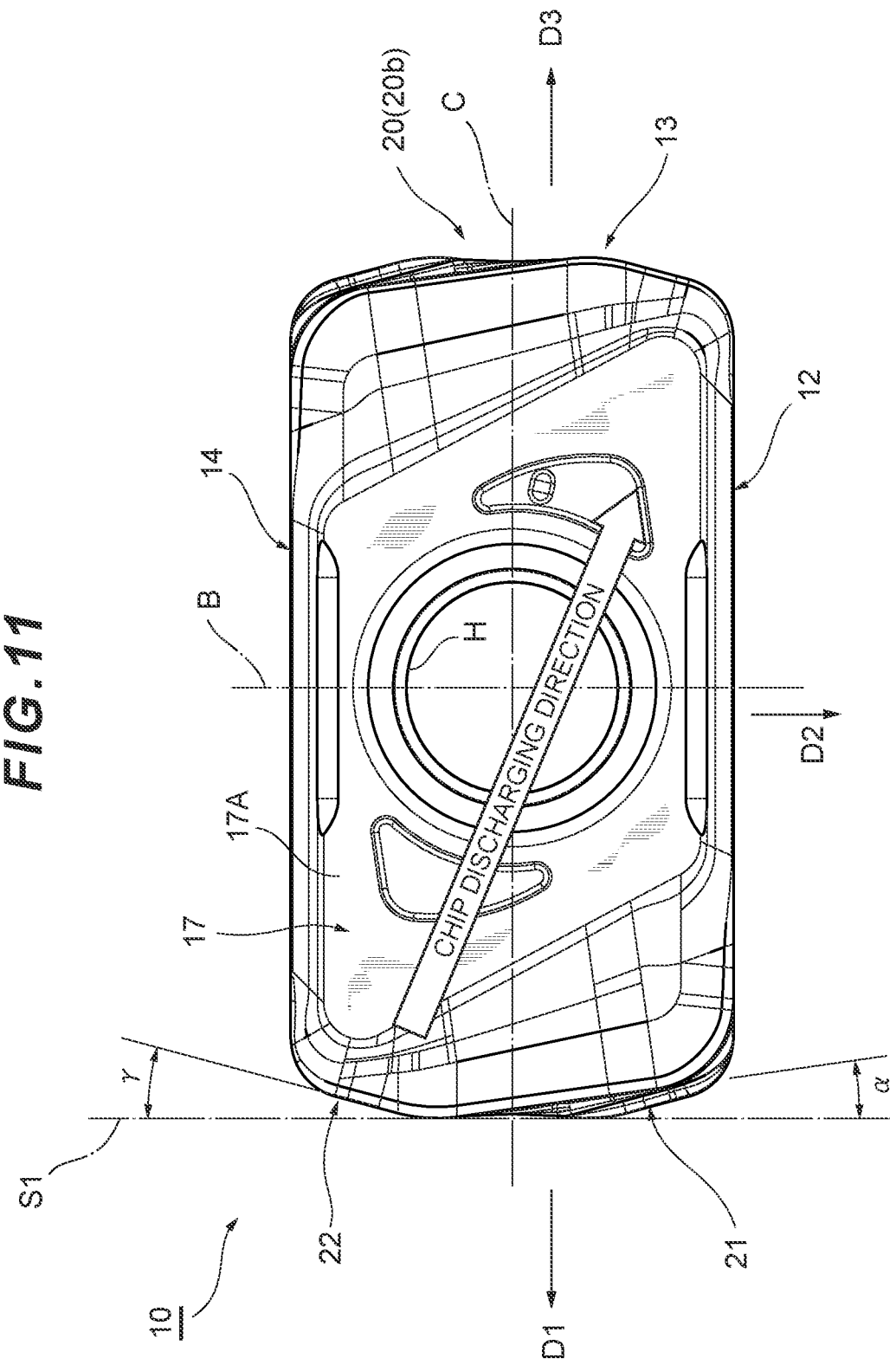

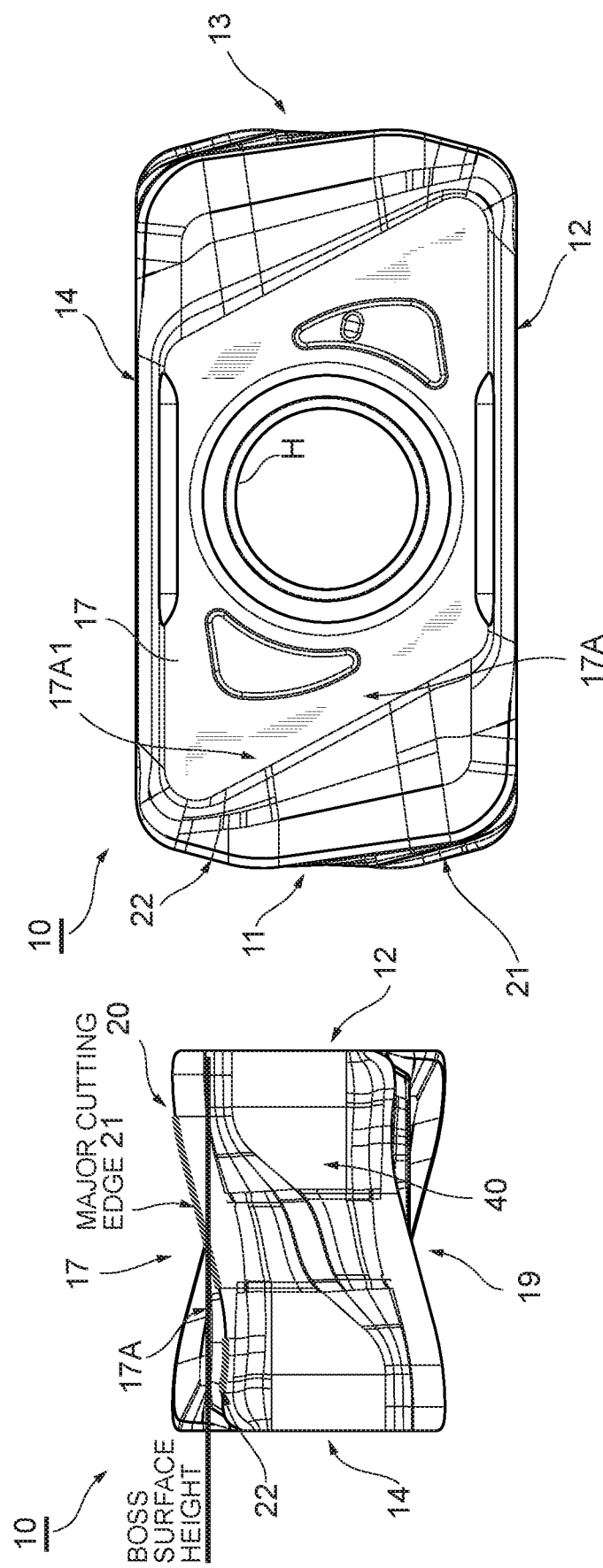

the body. Thereby the cutting resistance decreases, and the force to rotate the cutting insert decreases. Further, making the cutting angle of the cutting insert small like this leads to decreasing the thickness of chips, and increasing feeding, hence improvement is also expected in terms of the insert strength and the chip dischargeability.

CUTTING INSERT AND CUTTING TOOL EQUIPPED THEREWITH

BACKGROUND

Field

The present disclosure relates to a cutting insert and a cutting tool equipped therewith.

Description of Related Art

A cutting insert installed in a tool body has been used to cut work material such as metal. In cutting tools, such as high feed tools, a shape of a flank of the cutting insert has been improved in order to enhance the clamp performance and the like of the cutting insert of the body. For example, in Patent Publication JP6343016B, considering that an excessively heavy load may be applied to a screw in a case where a region, used as a constraining surface on the side surface of the cutting insert, is inclined in a direction away from the upper side to the lower surface side so as to depart from the center axis O1 of a through hole, a technique tis disclosed in which a first surface and a fourth surface of the cutting insert are parallel with the center axis O1 in a cross-section that includes the center axis O1 of the through hole, so that the holder can stably secure the insert on the first surface and the fourth surface (see paragraph [0048] in Patent Publication JP6343016B).

SUMMARY

The above configuration, however, is effective for the force of sliding the insert toward the outer periphery side, but may be insufficient for the force of rotating the insert. Further, in a case where the insert strength and the chip dischargeability are not considered, as in Patent Publication JP6343016B, an insert defect easily may occur during processing.

With the foregoing in view, it is an object of the present disclosure to provide a cutting insert and a cutting tool equipped with the cutting insert improving the force of clamping the insert, and improving the insert strength and the chip dischargeability.

A cutting insert according to an aspect of the present disclosure includes: an upper surface, which is a first end surface; a lower surface, which is a surface on an opposite side to the upper surface, and is a second end surface having an installing surface for installing a cutting tool to a body; a screw hole which has an axial line penetrating from the upper surface to the lower surface; a peripheral side surface which is formed such that the upper surface and the lower surface are connected; a major cutting edge and an inner cutting edge which are formed in an intersecting region between the upper surface and the peripheral side surface, and an intersecting region between the lower surface and the peripheral side surface, respectively; and a constraining surface which is formed on the peripheral side surface so as to at least partially contact with the body. An angle of the major cutting edge and an angle of the constraining surface are different in a top view viewed from the upper surface, and the angle of the major cutting edge is smaller than the angle of the constraining surface.

Making the angle of the major cutting edge smaller than the angle of the constraining surface, as mentioned in the above aspect, decreases a cutting angle of the cutting insert while enabling the installation of a conventional cutting tool The cutting insert according to the above mentioned aspect may include an R region which has a convex shape, and is formed between the major cutting edge and the inner cutting edge at a position closer to the inner cutting edge than an axial line passing through the center of each side of the major cutting edge and the inner cutting edge.

In the cutting insert according to the above mentioned aspect, in the top view, the inner cutting edge of the lower surface is located more to the outer side of the center of the cutting insert than the major cutting edge of the upper surface.

The cutting insert according to the above mentioned aspect, on a first virtual surface, which is vertical to the installing surface of the lower surface and passes through the major cutting edge of the upper surface, is shaped such that the constraining surface is more to the outer side of the center of the cutting insert than a flank of the major cutting edge of the upper surface, and the inner cutting edge of the lower surface is more to the outer side of the center of the cutting insert than the constraining surface, in a direction from the major cutting edge of the upper surface to the inner cutting edge of the lower surface.

In the cutting insert according to the above mentioned aspect, the angle of the major cutting edge and the angle of the inner cutting edge are different in the top view, and the angle of the major cutting edge is smaller than the angle of the inner cutting edge.

In the cutting insert according to the above mentioned aspect, a size of the angle of the inner cutting edge and a size of the angle of the constraining surface are the same in the top view.

In the cutting insert according to the above mentioned aspect, in a side view viewing the side surface on which the constraining surface is formed, the major cutting edge of the upper surface is formed at a height intersecting with the installing surface formed on the upper surface so as to be inclined with respect to the installing surface, and the inner cutting edge of the upper surface is formed at a lower position than the installing surface.

In the cutting insert according to the above mentioned aspect, on the first virtual cross-section sectioned at the virtual surface which is vertical to the installing surface of the lower surface and passes through the major cutting edge of the upper surface, the flank of the major cutting edge and the flank of the constraining surface are surfaces of which clearance angle is 0° or a negative value, and on a second virtual cross-section sectioned at a virtual surface which is vertical to the installing surface of the lower surface and passes through the inner cutting edge of the upper surface, the flank of the inner cutting edge is a positive surface of which clearance angle is a positive value.

A cutting tool according to an aspect of the present disclosure includes: a body which rotates around a rotation axis and includes an insert seat for holding a cutting insert; and the cutting insert according to any one of the above aspects, that is installed on the body such that the installing surface contacts with the insert seat.

BRIEF DESCRIPTION OF DRAWINGS

FIG. 6A is a diagram indicating a cutting angle θ1 of the cutting insert according to an embodiment of the present disclosure, and FIG. 6B is a diagram indicating a cutting angle θ2 of a conventional cutting insert;

FIG. 8A is a side view of the cutting insert viewed in a direction facing the first peripheral side surface portion along the first direction D1, and FIG. 8B is an enlarged view of a major cutting edge, an inner cutting edge and a bottom R portion on the upper surface side of the cutting insert;

FIG. 10A is a side view of the cutting insert viewed in a direction facing the first peripheral side surface portion along the first direction D1, and FIG. 10B is a cross-sectional view of the cutting insert sectioned at a virtual line (A-A line), for describing an example of the shape of the cutting insert on the peripheral side surface from the major cutting edge of the upper surface to the inner cutting edge of the lower surface;

FIG. 11 is a top view of the cutting insert for describing an angle of the major cutting edge and an angle of the inner cutting edge viewed in a direction facing the upper surface;

FIG. 12A is a side view of the cutting insert viewed in a direction facing the first peripheral side surface portion, and FIG. 12B is a top view of the cutting insert, for describing the relationship of the relative heights of the major cutting edge, the boss surface and the inner cutting edge viewed in a direction facing the side surface.

DETAILED DESCRIPTION

Embodiments of the cutting insert according to the present disclosure and the cutting tool equipped with the cutting insert will be described in detail with reference to the drawings (see FIG. 1 and the like).

Overview of Cutting Insert

Figure 1:
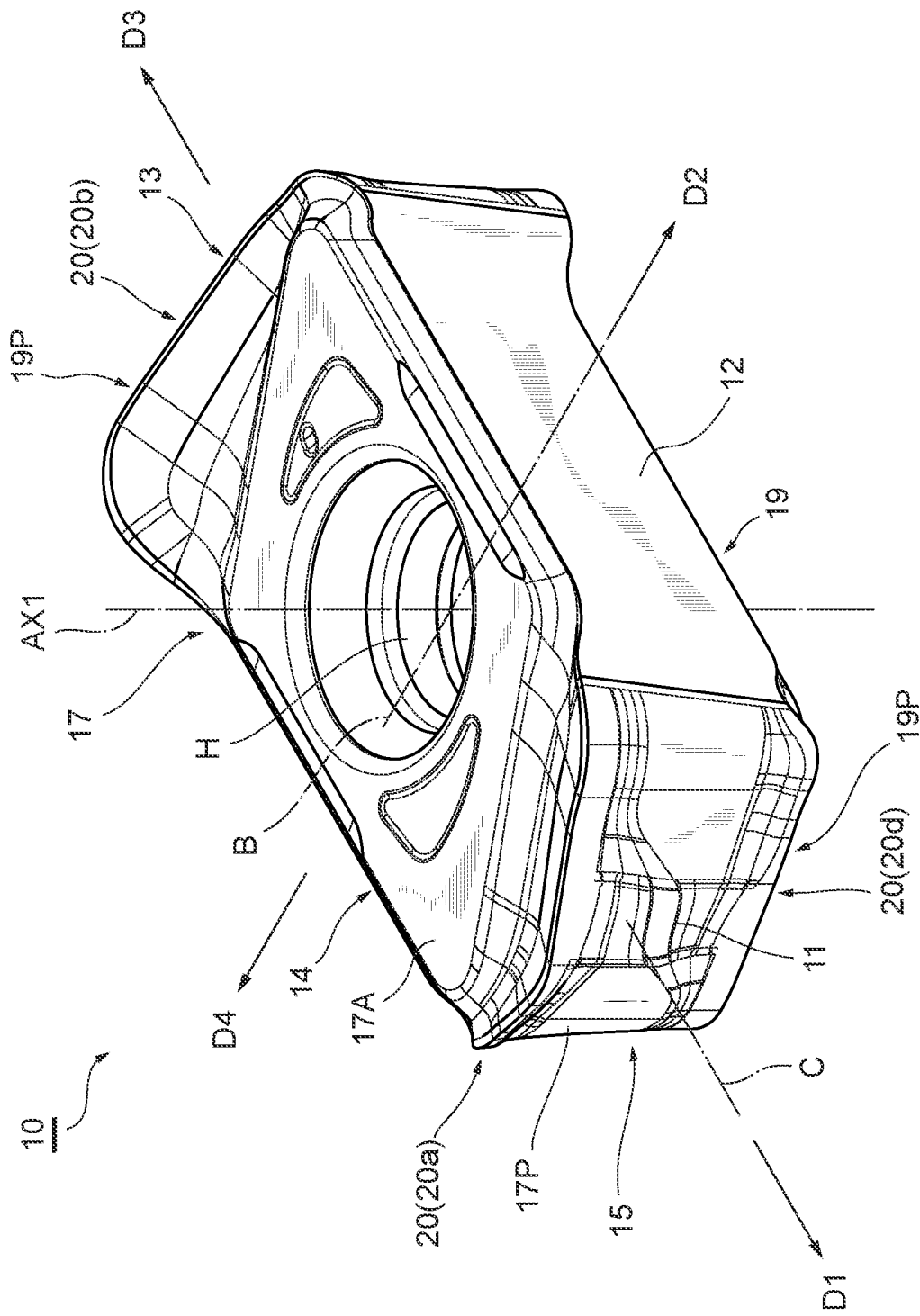
FIG. 1 is a perspective view of a cutting insert.
Figure 2:
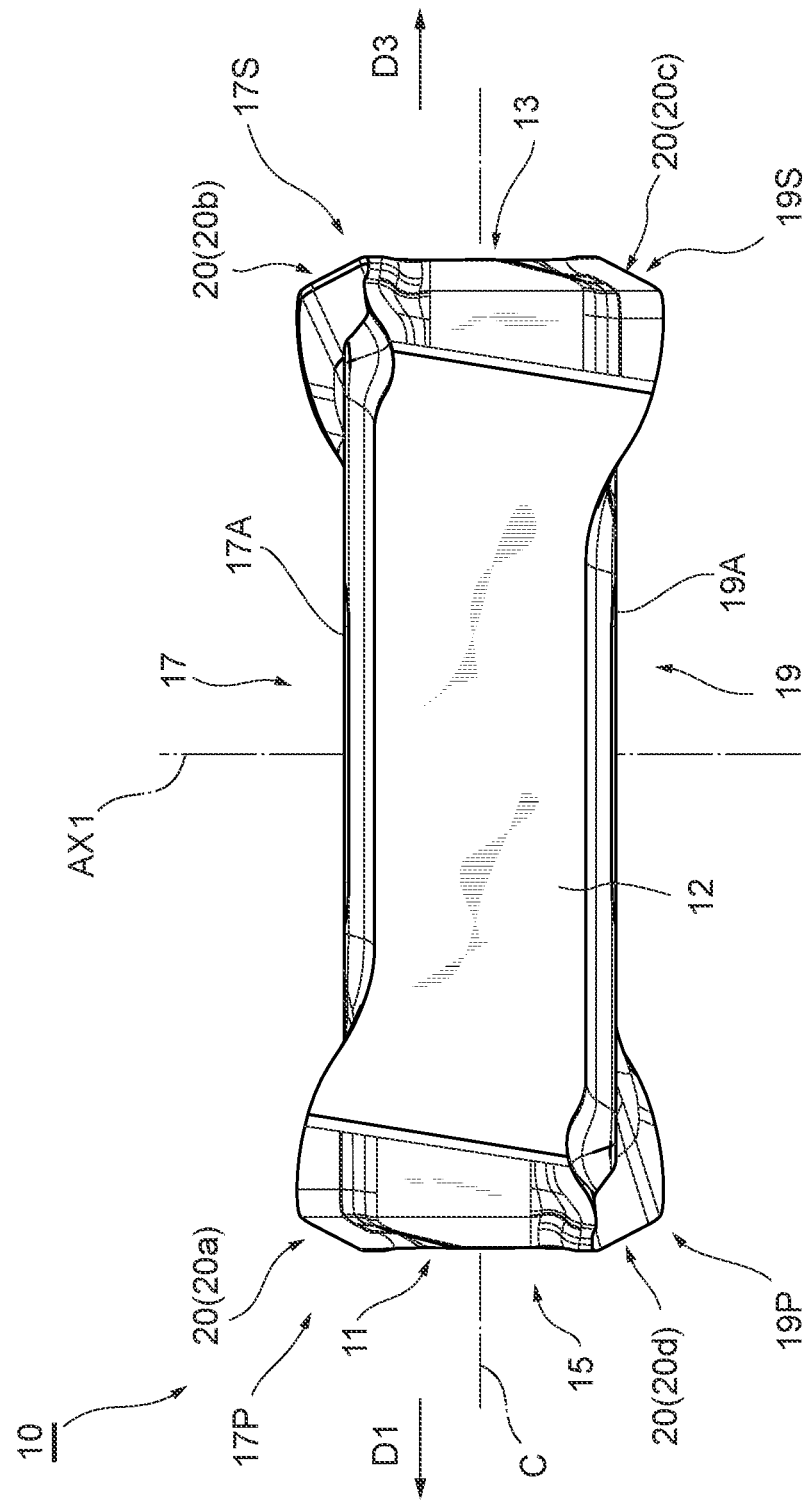
FIG. 2 is a side view of the cutting insert viewed in a direction D2 facing a second peripheral side surface portion.
Figure 7:
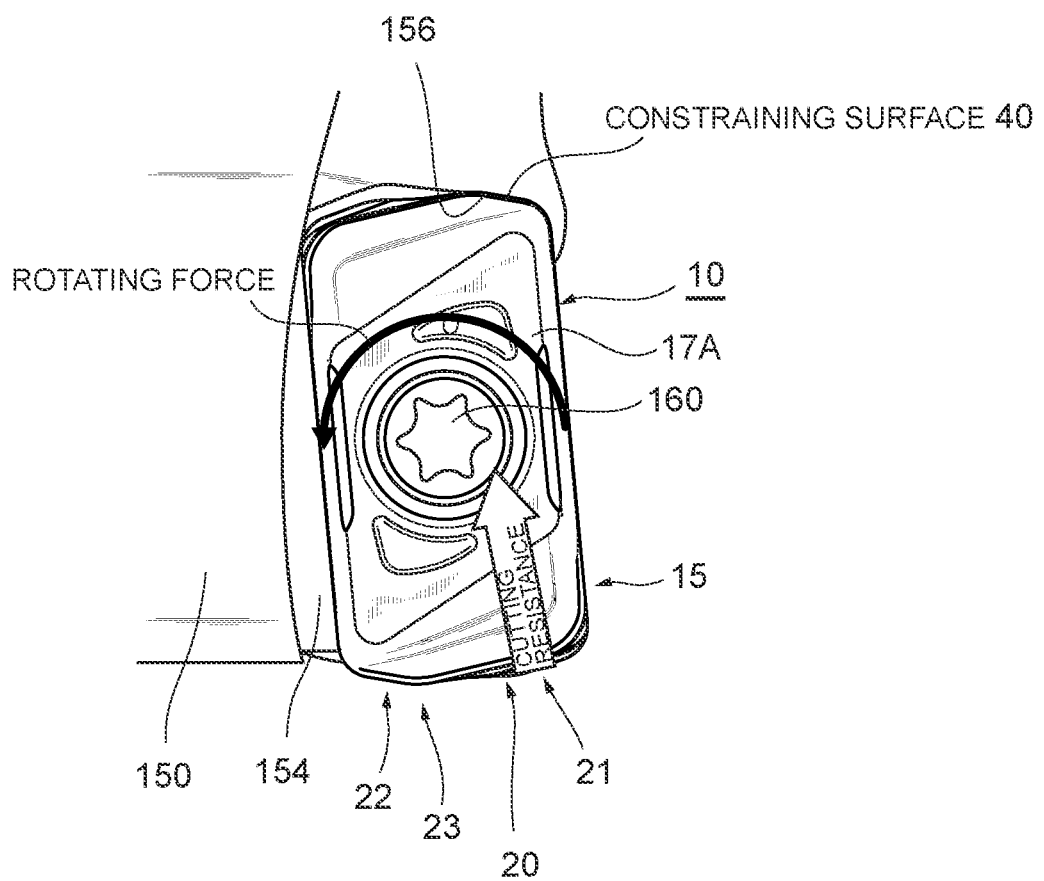
FIG. 7 is an overview of the shape of the cutting insert installed in the end mill, and the force that is applied to the cutting insert during cutting.

The cutting insert 10 illustrated in FIG. 1 and the like is configured as an insert that is installed in a body 150 of an end mill 100 (see FIG. 5 to FIG. 7), and both surfaces of the insert can be used by reversing them when installed. The cutting insert 10 of this embodiment includes: an upper surface 17 which is a first end surface facing upward in FIG. 2; a lower surface 19 which is s second end surface facing downward in FIG. 2; a peripheral side surface 15 that connects the upper surface 17 and the lower surface 19, and is constituted by a first peripheral side surface portion 11, a second peripheral side surface portion 12, a third peripheral side surface portion 13 and a fourth peripheral side surface portion 14. In the top view (see FIG. 3), the shape of the upper surface 17 is approximately a parallelogram of which one set of approximately parallel ridge lines is longer than the other set of approximately parallel ridge lines. A through hole H, that penetrates the upper surface 17 and the lower surface 19 are formed at the center of the cutting insert 10 (see FIG. 2, FIG. 3 and the like).

Figure 3:
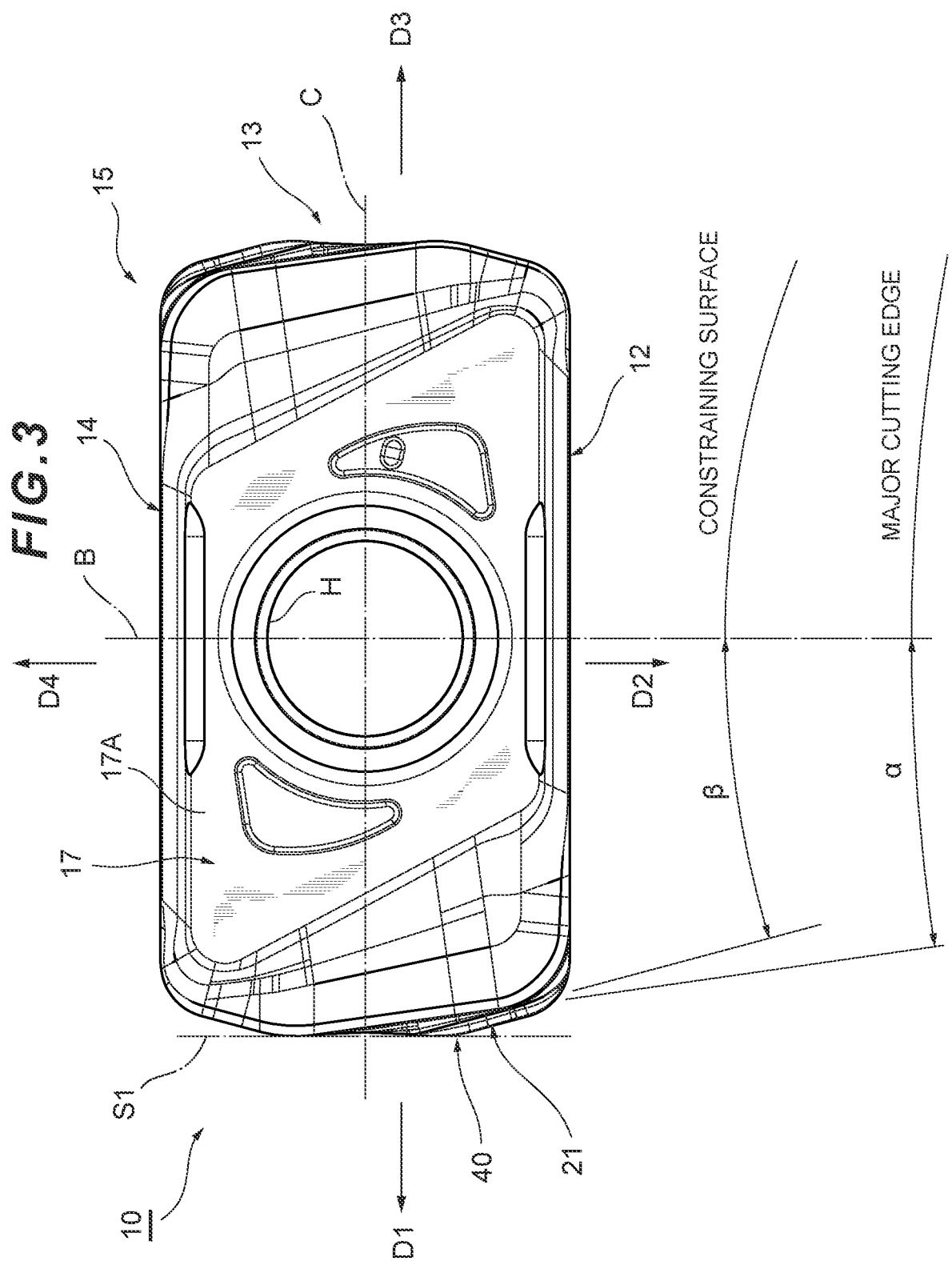
FIG. 3 is a top view of the cutting insert viewed in a direction facing an upper surface.

The first peripheral side surface portion 11 is a surface that is vertical to the center axis AX1 and faces a first direction D1 corresponding to the left direction in FIG. 3, and is connected to the short ridge lines of the upper surface 17 and the lower surface 19 respectively. The second peripheral side surface portion 12 is a surface that is vertical to the center axis AX1 and faces a second direction D2 corresponding to the lower direction in FIG. 3, and is connected to the long ridge lines of the upper surface 17 and the lower surface 19 respectively. The third peripheral side surface portion 13 is a surface that is vertical to the center axis AX1 and faces a third direction D3 corresponding to the right direction in FIG. 3, and is connected to the short ridge lines of the upper surface 17 and the lower surface 19 respectively. The fourth peripheral side surface 14 is a surface that is vertical to the center axis AX1 and faces a fourth direction D4 corresponding to the upper direction in FIG. 3, and is connected to the long ridge lines of the upper surface 17 and the lower surface 19 respectively. The first direction D1 and the third direction D3 are parallel with each other and are in opposite directions from each other, and are vertical to the second direction D2 and the fourth direction D4 which are parallel with each other and are in opposite directions from each other respectively. The second peripheral side surface portion 12 and the fourth peripheral side surface portion 14 are formed to be planes or to be generally flat, and to be parallel with each other, except for the connecting portions with the first peripheral side surface portion 11 or the third peripheral side surface portion 13 at both ends (see FIG. 3 and the like).

The upper surface 17 includes a boss surface portion 17A that is formed to surround the through hole H (see FIG. 1, FIG. 3 and the like). The boss surface portion 17A is a surface that contacts an insert seat 154 of the body 150 of the end mill 100 (see FIG. 5) when the cutting edge formed on the lower surface 19 side is used for processing.

In a connecting region 17P between the upper surface 17 and the first peripheral side surface portion 11, a cutting edge 20 is formed (see FIG. 1 and the like). In the same way, a cutting edge 20 is formed in a connecting region 17S between the upper surface 17 and the third peripheral side surface portion 13, in a connecting region 19P between the lower surface 19 and the first peripheral side surface portion 11, and in a connecting region 19S between the lower surface 19 and the third peripheral side surface portion 13 respectively. A total of four edges 20 are constituted of two pairs of cutting edge portions 20a to 20d. One pair of the cutting edge portions 20a and 20b are formed in the intersecting region between the upper surface 17 and the peripheral side surface 15, so as to be rotationally symmetric (point symmetry) by 180° with respect to the center axis AX1. The other pair of cutting edge portions 20c and 20d are formed in the intersecting region between the lower surface 19 and the peripheral side surface 15, so as to be rotationally symmetric by 180° with the pair of cutting edge portions 20a and 20b with respect to the axial line B or the axial line C (see FIG. 1, FIG. 3 and the like). This pair of cutting edge portions 20c and 20d as well are formed so as to be rotationally symmetric by 180° with respect to the center axis AX1. The axial line B is an axis that vertically intersects the center axis AX1 at the center point (point equidistant from the upper surface 17 and the lower surface 19), and extends in the second direction D2 and the fourth direction D4, and the axial line C is an axis that vertically intersects with the center axis AX1 and the axial line B at the center point (point equidistant from the upper surface 17 and the lower surface 19) of the center axis AX1, and extends in the first direction D1 and the third direction D3 (see FIG. 1 and the like).

For example, in a case where one cutting edge portion 20a in the intersecting region between the upper surface 17 and the first peripheral side surface portion 11 is used and damaged during the cutting, the cutting edge portion 20b, which is on the opposite side of the cutting edge portion 20a on the upper surface 17, can be used for cutting by rotating the cutting insert 10 by 180° around the center axis AX1. In a case where both of the cutting edge portions 20a and 20b on the upper surface 17 are damaged, the cutting insert 10 is rotated around the axial line B allowing it to be rotated into cutting position, whereby one of the cutting edge portions 20c or 20d, which are on the lower surface 19 and are unused, can be used for cutting. Each cutting edge portion 20a to 20d has an identical configuration, hence the cutting edge portion 20a located in the intersecting region between the upper surface 17 and the first peripheral side surface portion 11 will be described below as a representative example.

Structure of Cutting Edge Portion Area

In the cutting edge portion 20a, the major cutting edge 21 and the inner cutting edge 22, which are cutting edges 20 used during cutting processing, and an R portion (hereafter referred to as bottom R portion) 23, which is disposed to be curved between the major cutting edge 21 and the inner cutting edge 22, are formed (see FIGS. 8A and 8B and the like). The inner cutting edge 22 is located closer to the fourth peripheral side surface portion 14 than the major cutting edge 21.

When the cutting insert 10 is installed in the end mill 100, the major cutting edge 21 turns to the outer periphery side of the front end of the end mill 100, and is mainly used for cutting. When the cutting insert 10 is installed in the end mill 100, the inner cutting edge 22 turns to the inner periphery side of the end mill 100 and functions as the inner peripheral cutting edge. When the cutting insert 10 is installed in the end mill 100, the bottom R portion 23 turns to the front end side of the end mill 100 and functions as the end cutting edge.

Figure 4:
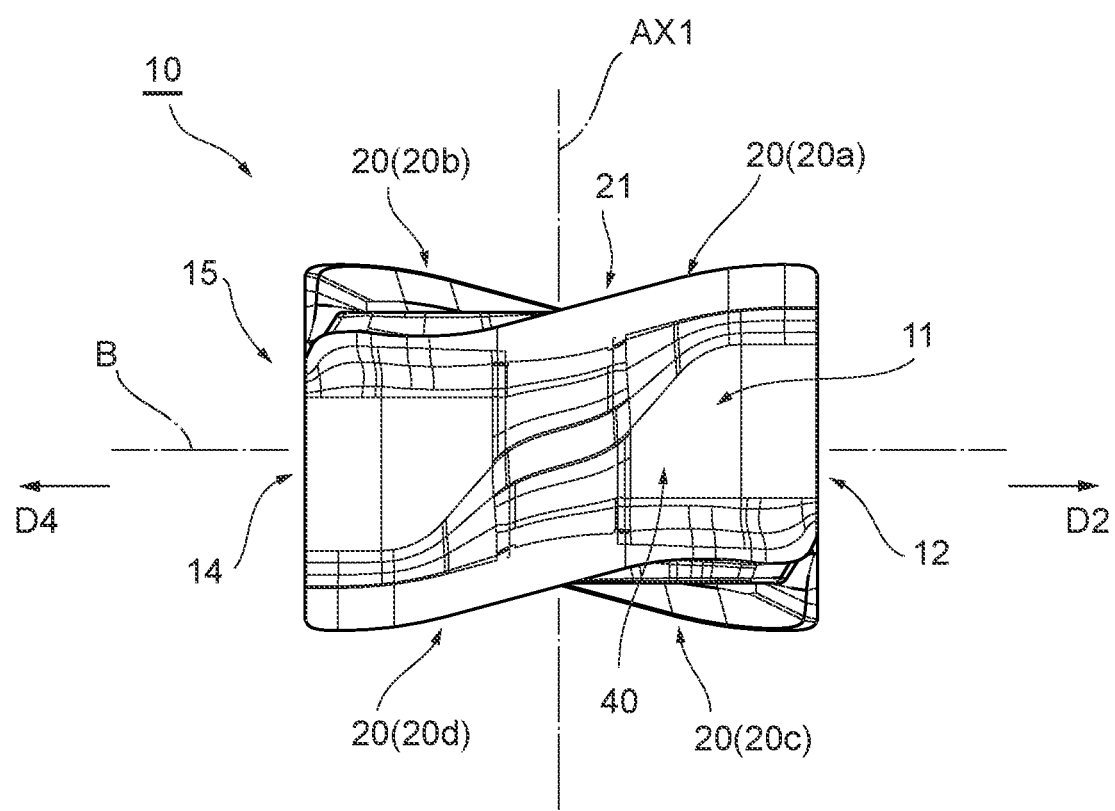
FIG. 4 is a side view of the cutting insert viewed in a direction facing a first peripheral side surface portion along a first direction D1.

In the first peripheral side surface portion 11 (and the third peripheral side surface portion 13), a portion to be a flank of the cutting edge portion 20a and a portion to functions as the constraining surface 40 are formed (see FIG. 4, FIGS. 10A, 10B, and the like). The constraining surface 40 at least partially contacts a side wall 156 of the insert seat 154 of the body 150 of the end mill 100, and constrains so that the cutting insert 10 does not rotate around the center axis AX1, even if the moment is generated due to the reaction force (cutting force) received from the work material during the cutting (see FIG. 7 and the like). In the cutting insert 10 of this embodiment, the constraining surface 40 of the first peripheral side surface portion 11 is an inclined surface, which is formed such that the distance from the axial line B decreases in the direction toward the second peripheral side surface portion 12 in the top view. In the top view, the inclination angle of the constraining surface 40 with respect to the axial line B (in other words, the angle of the constraining surface 40 with respect to the virtual surface that is vertical to the axial line C (an example is indicated by sign S1 in FIG. 3)) is indicated by the sign β. For example, in this embodiment, the inclination angle β of the constraining surface 40 is 15°.

The major cutting edge 21 is an inclined cutting edge that is inclined approximately linearly in the side view viewed in a direction facing the first peripheral side surface portion 11 (see FIG. 4 and the like). The inclination angle of the major cutting edge 21 with respect to the boss surface 17A in FIG. 4 may be appropriately set in accordance with the specification or the like. The major cutting edge 21 is formed so as to gradually rise in the thickness direction of the cutting insert 10 (direction along the center axis AX1) approaching closer to the second peripheral side surface portion 12 away from the inner cutting edge 22 (see FIG. 4 and the like).

Inclination Angle Between Major Cutting Edge and Constraining Surface

In the cutting insert 10 of this embodiment, the major cutting edge 21 is formed as an inclined surface of which distance from the axial line B decreases in the direction approaching the second peripheral side surface portion 12 in the top view. In the top view, the inclination angle of the major cutting edge 21 with respect to the axial line B (that is, an angle of the major cutting edge 21 with respect to the virtual surface S1 that is vertical to the axial line C) is indicated by a sign α (see FIG. 3). For example, the inclination angle α of the major cutting edge 21 is 8° in this embodiment.

As mentioned in this embodiment, the cutting insert 10, of which angle α of the major cutting edge 21 and the angle β of the constraining surface 40 are different ($\alpha \neq \beta$) in the top view, can suppress defects of the major cutting edge 21 and the like of this insert 10 during cutting, and suppress deformation of the side wall 156 of the body 150 of the end mill 100. In other words, the cutting angle θ during cutting (cutting angle of the major cutting edge 21 with respect to the cutting surface of the work material) is basically determined by subtracting the inclination degree of the cutting insert 10 itself from the total of the angle of the inclination angle α of the major cutting edge 21 and the inclination angle of the cutting insert 10 installed in the end mill 100 generated due to the inclination angle β of the constraining surface 40 (see FIGS. 6A and 6B and the like). Hence, in the case of a cutting insert 10 of which angle α of the major cutting edge 21 and the angle β of the constraining surface 40 are the same ($\alpha=\beta$) in the top view, for example, the cutting angle θ becomes a value determined by subtracting the inclination angle of the cutting insert 10 itself from $\alpha+\beta$ (see FIG. 6B). For example, the cutting angle θ2 of the conventional cutting insert 10', where both α and β are 15° and the inclination angle of the cutting insert 10 is 13°, is 17°. On the other hand, in the case of the cutting insert 10 of this embodiment, of which the angle β of the constraining surface 40 is the same as the conventional cutting insert ($\beta=15°$) and the angle α of the major cutting edge 21 is smaller than 15° (e.g. α=8°), the cutting angle θ1 can be smaller (e.g. θ1=10°), while the end mill 100 can still be installed in the conventional body (θ1<θ2) (see FIG. 6A).

In terms of general high-feed processing, high efficiency processing using high-feed processing is based on a mechanism that generates thin chips. The thickness of a chip is determined by the cutting angle θ of the insert. In a case of an insert of which cutting angle θ is large (e.g. 90°), if the feed-per-tooth is set to x mm, the thickness of the chip also becomes x mm and the mechanism to generate thin chips does not function. However, as this cutting angle θ is decreased to a sharper acute angle, the chip becomes thinner, and as the chip becomes thinner, the feed speed can be increased and the cycle time can be decreased. Further, if the cutting angle θ is decreased, the cutting resistance in the feeding direction decreases, hence according to the cutting insert 10 of this embodiment, which can make the cutting angle θ1 smaller than the conventional angle θ2 (θ1<θ2) based on the above mentioned mechanism, the cutting resistance in the feeding direction, which the cutting insert 10 receives during cutting, decreases, and the magnitude of the force (torque) of rotating the cutting insert 10 around the center axis AX1 during cutting and the influence of this force also decrease. In some cases, decreasing the cutting angle θ, which decreases the cutting resistance in the feeding direction, may increase the total cutting resistance (a value including the main cutting force and the thrust force), but even if the cutting resistance increases like this, the seating stability of the cutting insert 10 has been improved even more in this embodiment (see the later mentioned description on "relative positions of major cutting edge on upper surface and inner cutting edge on lower surface" and the like), the entire processing efficiency can be improved. This leads to control of such defects as the deformation of the body 150, and as a result, the clamp performance of the cutting insert 10 is improved, and defects of the cutting insert 10 during cutting can be suppressed.

Position of Bottom R Portion

The bottom R portion 23 is formed in a convex shape which protrudes in the first direction D1, so that the cutting insert 10 faces the front side of the end mill 100 when the cutting insert 10 is installed in the end mill 100 (see FIG. 3 and the like). In the side view viewing in a direction facing the first peripheral side surface portion 11 (see FIG. 4 and FIGS. 8A and 8B), the bottom R portion 23 is formed between the major cutting edge 21 and the inner cutting edge 22, at a position closer to the inner cutting edge 22 than the center line (center axis AX1 in this case) of the cutting insert 10 (that is, at a position closer to the fourth peripheral side surface portion 14 than the center axis AX1). In this way, according to the cutting insert 10, the cutting resistance acts more from the inner side. In other words, of the cutting resistances that act on the cutting insert 10 during cutting, the resistance that acts via the bottom R portion 23 acts more from the inner side (that is, the side closer to the rotation axis of the end mill 100) (see FIG. 7 and the like), and the force moment that rotates the cutting insert 10 around the center axis AX1 decreases. This means that the cutting resistance applied to the cutting insert 10 and the cutting edge 20 thereof disperses, and as a result, the clamp performance of the cutting insert 10 improves, and defects of the cutting insert 10 and deformation of the body 150 during cutting are suppressed. The illustrated cutting insert 10 is merely an example, where the bottom R portion 23 is formed as described above, and the specific position, shape and the like of the bottom R portion 23 may be appropriately designed or changed in accordance with the specification and the like of the cutting insert 10.

Figure 9A:
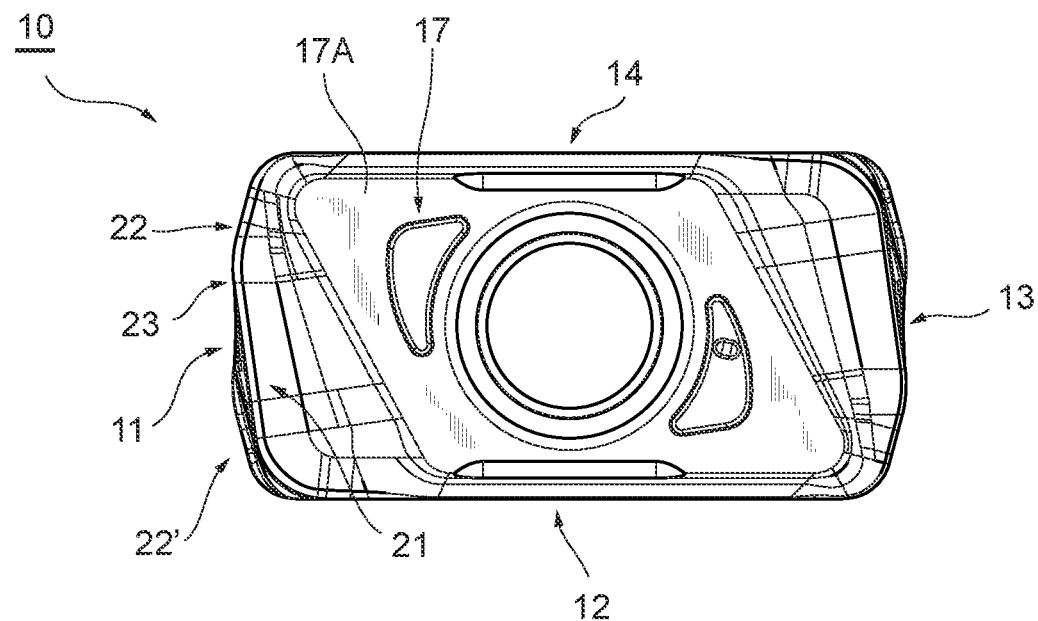
FIG. 9A is a top view of the cutting insert for describing the relative positions of the major cutting edge of the upper surface and the inner cutting edge of the lower surface.
Figure 9B:
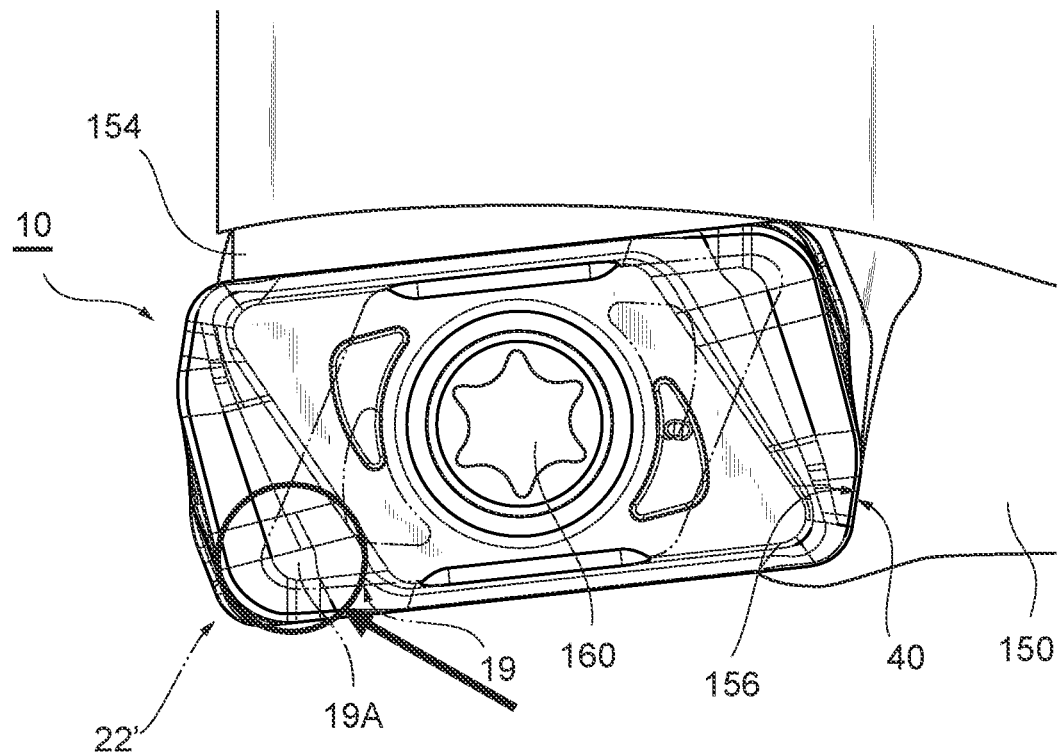
FIG. 9B is a diagram for describing the shape of the boss surface (installation surface in the end mill), assuming that the cutting insert is transparent.

Relative Positions of Major Cutting Edge on Upper Surface and Inner Cutting Edge on Lower Surface The inner cutting edge 22 is formed to be connected with the bottom R portion 23, so as to function as an inner peripheral edge which faces the inner periphery side of the end mill 100. In the cutting insert 10 of this embodiment, the inner cutting edge on the lower surface 19 (indicated by the sign 22' in FIGS. 9A, and 9B, FIGS. 10A, and 10B) is located on the first direction D1 side of the major cutting edge 21 on the upper surface 17 in the top view (in other words, the distance from the axial line B is longer in the inner cutting edge 22' on the lower surface 19 side (opposite face side) than the major cutting edge 21 on the upper surface 17). In this cutting insert 10, the inner cutting edge 22' on the opposite face (lower surface 19) is disposed on the first direction D1 side of the major cutting edge 21 on the upper surface 17, whereby the boss surface (installing surface) 17A on this opposite face (lower surface 19) is disposed more on the first direction D1 side, to be closer to the major cutting edge 21 on the front face (upper surface 17) (see FIG. 9B, particularly the portion enclosed by O). By disposing the boss surface 17A to be closer to the major cutting edge 21 on the front surface (upper surface 17) like this, the seating surface of the cutting insert 10 on the body 150 increases, and the seating surface thereof on the rear side (lower surface 19 side) of the major cutting edge 21 on the upper surface 17 also increases. According to this cutting insert 10, the cutting resistance that acts on the major cutting edge 21 and the like can be received by a wider seating surface and thereby distributed, hence the strength of the cutting insert 10 is relatively increased, and defects of the major cutting edge 21 and the like during cutting can be suppressed. This can be explained by a leverage principle (an object can more easily be moved with a small force if the force point is distant from the fulcrum, but this move becomes more difficult as the force point is closer to the fulcrum). Movement or vibration of the cutting insert 10 may lead to the generation of abnormal damage and defects, and to suppress such abnormal damage and defects, it is critical to contact the cutting insert 10 to the body 150 directly below the cutting edge 20, and not just widen the area of the seating surface.

Shape of Cutting Insert on Peripheral Side Surface From Major Cutting Edge on Upper Surface to Inner Cutting Edge on Lower Surface A shape and structure of the major cutting edge 21, the constraining surface 40 and the inner cutting edge 22' on the virtual cross-section vertical to the axial line B (that is, a virtual cross-section that is vertical to the boss surface 17A of the upper surface 17 and extends in the direction of the axial line C), will be described (see FIGS. 10A, 10B, and the like). In a case where a virtual line (A-A line) is parallel with the center axis AX1 and passes through the major cutting edge 21 on the upper surface 17 and the inner cutting edge 22' on the opposite face (lower surface 19) (see FIG. 10B), a cross-section of the cutting insert 10 of this embodiment along the vertical cross-section, which passes through this A-A line and is vertical to the axial line B, is illustrated in FIG. 10A. In this cross-section, in a direction from the major cutting edge 21 on the upper surface 17 to the inner cutting edge 22' on the lower surface 19, (i) the constraining surface 40 is disposed more on the outer side of the cutting insert 10 than the flank 21f of the major cutting edge 21 on the upper surface 17 in the first direction D1 by the length of the difference j, and (ii) the inner cutting edge 22' on the lower surface 19 is disposed more on the outer side of the cutting insert 10 than the constraining surface 40 in the first direction D1 by the length of the difference k (see FIG. 10B). In the case of the cutting insert 10 having a cross-section of which the protruding amount increases in the first direction D1 approaching the inner cutting edge 22' on the lower surface 19 from the major cutting edge 21 on the upper surface 17, as mentioned above, the cross-section can be increased more compared with the conventional cutting insert, therefore the strength of the cutting insert 10 is increased, and defects during cutting can be suppressed. The length of the difference j is 0.1 [mm], for example, and the length of the difference k is 0.28 [mm], for example, but these are merely examples, and these differences j and k may be appropriately set in accordance with the specifications or the like.

Angle of Major Cutting Edge and Angle of Inner Cutting Edge in Top View

In the cutting insert 10, the angle of the major cutting edge 21 and the angle of the inner cutting edge 22 in the top view may be different, and the angle of the major cutting edge 21 may be smaller than the angle of the inner cutting edge 22. In this embodiment, when the inclination angle of the inner cutting edge 22 with respect to the axial line B in the top view (in other words, the angle of the inner cutting edge 22 with respect to the virtual surface S1 that is vertical to the axial line C) is γ (see FIG. 11), this inclination angle γ is larger than the inclination angle α of the major cutting edge 21 with respect to the axial line B (in other words, the angle of the major cutting edge 21 with respect to the virtual surface S1 that is vertical to the axial line C). If the inclination angle γ of the inner cutting edge 22 is relatively large like this, the chips generated by the inner cutting edge 22 during cutting (e.g. ramping processing) can be discharged more toward the outer side (outer side of the end mill 100 in the diameter direction) (see FIG. 11). The inclination angle α may be 8°, and the inclination angle γ may be 15°, for example, (the directions of the inclination of the major cutting edge 21 and the inner cutting edge 22 with respect to the virtual surface S1 or the axial line B are different from each other), but these are merely examples and may be appropriately set in according with the specifications and the like.

The inclination angle γ of the inner cutting edge 22 may be the same as the inclination angle β of the constraining surface 40 (see FIG. 3). For example, in this embodiment, the inclination angle β of the constraining surface 40 and the inclination angle γ of the inner cutting edge 22 are both 15° (see FIG. 3, FIG. 11 and the like). These inclination angles are the same as the inclination angle of the constraining surface and the inclination angle of the inner cutting edge of an example of the conventional cutting insert, so in this case, the end mill 100 can be installed in the conventional body, and the cutting performance of the inner cutting edge 22, that is similar to the conventional cutting insert, can be implemented.

Heights of Major Cutting Edge, Boss Surface and Inner Cutting Edge in Side View

In the cutting insert 10 of the embodiment illustrated in FIGS. 12A and 12B, in the side view (see FIG. 4 and the like) viewed in a direction facing the first peripheral side surface portion 11 on which the constraining surface 40 is formed, (i) the major cutting edge 21 on the upper surface 17 is formed to be inclined with respect to the boss surface 17A on the upper surface 17 and to intersect with this boss surface 17A (in other words, the major cutting edge 21 crosses at the height of the boss surface 17A in the side view), and (ii) the inner cutting edge 22 on the upper surface 17 is formed at a position lower than the boss surface 17A (that is, a position between the boss surface 17A and the lower surface 19) (see FIGS. 12A and 12B). Among the chips discharged from the major cutting edge 21, the chips that roll inward near the bottom face contact, for instance, the wall surface that rises to the boss surface 17A (or the intersecting ridge line between this wall surface and the boss surface 17A), whereby, by the contact, for instance with the wall surface that rises to the boss surface 17A, these chips are discharged outside in the diameter direction of the rotation axis AX3 of the end mill 100 (see FIG. 5). Further, among the chips discharged from the inner cutting edge 22, the chips that are discharged in a continuous state during helical processing contact the wall surface that rises to the boss surface 17A (or the intersecting ridge line between this wall surface and the boss surface 17A), whereby these chips are also discharged outside in the diameter direction of the end mill 100. This aspect will be described in detail below. If the cutting speed is the same (constant) in each portion of the major cutting edge, the chips will be discharged from the major cutting edge in the right angle direction, but in the case of the major cutting edge 21 of this embodiment that is used for the end mill 100 and functions as a cutter, the cutting speed is faster on the outer periphery side, hence the chips are basically discharged faster on the outer periphery side of the major cutting edge 21 than the center side thereof, and the chips are curled in the inward direction. By decreasing the distance from the major cutting edge 21 to the boss surface 17A (to be precise, the distance to the wall surface that rises to the boss surface 17A) in the direction toward the center, the inner side of the chips contact the wall surface before curling, and only the inner side of the chips are constrained (raised), hence the chips change shape so as to move toward the outer side. Considering such a phenomenon, the relative heights (positional relationships in the axis direction of the center axis AX1) of the major cutting edge 21, the boss surface 17A and the inner cutting edge 22 are determined as above in the cutting insert 10, therefore dischargeability of the chips during cutting processing, particularly helical processing, improves.

Setting of Flank/Clearance Angle of Cutting Edge

The shapes and structures of the major cutting edge 21 and the inner cutting edge 22 on a virtual cross-section that is vertical to the axial line B (in other words, a virtual cross-section that is vertical to the boss surface 17A on the upper surface 17 and extends in the direction of the axial line C) in the cutting insert 10 according to the embodiment illustrated in FIGS. 13A to 13C will be described (see FIGS. 13A to 13C). In the case where a virtual line (B-B line) is a line that is parallel with the center axis AX1 and passes through the major cutting edge 21 on the upper surface 17 (see FIG. 13A), a cross-section of the major cutting edge 21 at a virtual surface S2, which passes through the B-B line and is vertical to the axis line B, is illustrated (see FIG. 13B). Further, in the case where a virtual line (C-C line) is a line that is parallel with the center axis AX1 and passes through the inner cutting edge 22 on the upper surface 17 (see FIG.

Figure 13C:
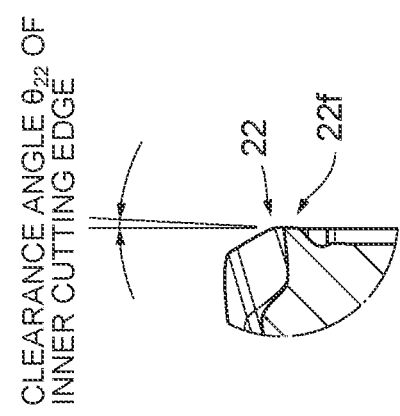
FIG. 13C is a cross-sectional view of the inner cutting edge sectioned along the virtual surface S3, of an example of the major cutting edge of which clearance angle of the flank is set to a neutral or negative value, and the inner cutting edge of which clearance angle of the flank is set to a positive value.
Figure 13B:
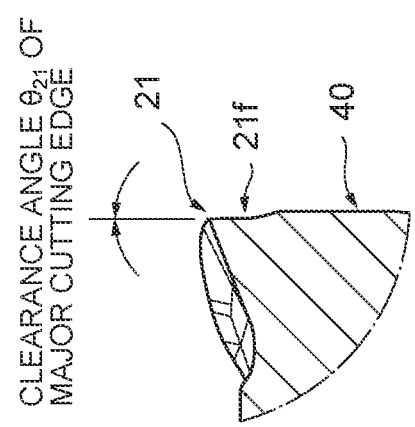
FIG. 13B is a cross-sectional view of the major cutting edge sectioned along the virtual surface S2.
Figure 13A:
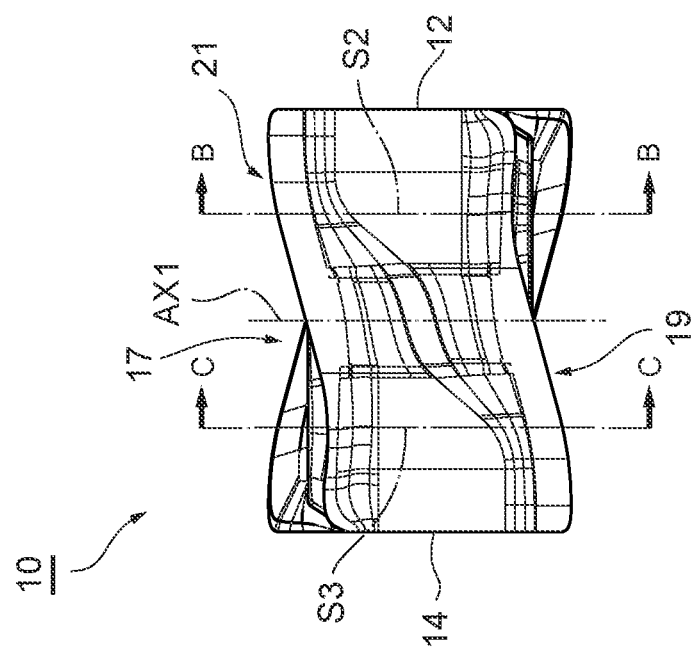
FIG. 13A is a side view of virtual surfaces S2 and S3 viewed in a direction facing the first peripheral side surface portion.

13A), a cross-section of the inner cutting edge 22 at the virtual surface S3, which passes through the C-C line and is vertical to the axis line B, is illustrated (see FIG. 13C). As illustrated in the cross-section along the virtual surface S2, the flank 21$f$ of the major cutting edge 21 is a neutral surface of which clearance angle $\theta_{21}$ is 0° (this may be referred to as a "negative surface" in some cases) or is a negative value (this may be called a "reverse positive surface" in some cases), for example, (see FIG. 13B), indicating that this major cutting edge 21 is a major cutting edge of which damage is suppressed during cutting. Further, as illustrated in the cross-section along the virtual surface S3, the flank 22$f$ of the inner cutting edge 22 is a positive surface of which clearance angle $\theta_{22}$ is 3°, for example, (see FIG. 13C), and this inner cutting edge 22 is an inner cutting edge for which finer chips are discharged during cutting.

Overview of End Mill

Figure 5:
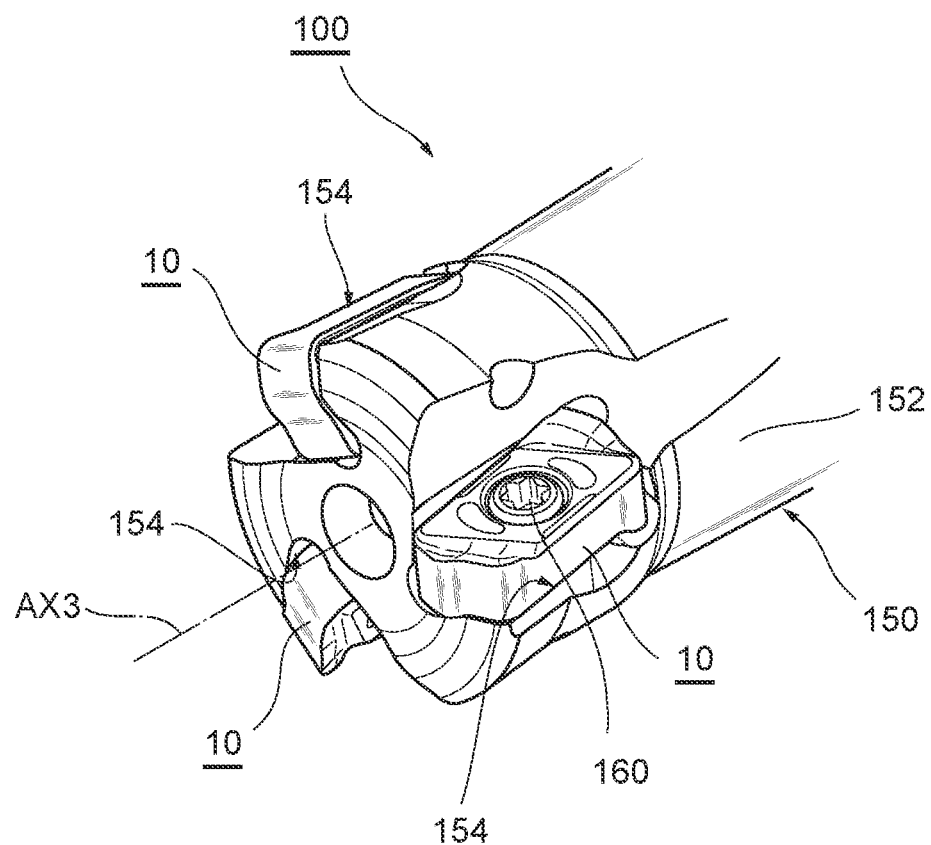
FIG. 5 is a perspective view of a front end portion of an end mill and the cutting insert that is installed in an insert seat of the front end portion.

The cutting insert 10 described above is installed in the insert seat 154 of the end mill 100 and is used for cutting processing (see FIG. 5). The body 150 of the end mill 100 includes a cylindrical shank 152, and three insert seats 154 are formed at the front end of the rotation axis AX3 of the shank 152. The three insert seats 154 have an identical structure to hold the cutting insert 10, and are disposed with a 120° interval with the rotation axis AX3 at the center (see FIG. 5). Each insert seat 154 includes a flat portion, and a female screw is formed in this flat portion. A male screw 160, which penetrates through the through hole H of the cutting insert 10, is engaged with this female screw so as to press the boss surface portion 17A on the upper surface 17 with the head of the male screw 160, and causes the boss surface portion 19A on the lower surface 19 to contact with the flat portion of each insert seat 154, whereby the cutting insert 10 is secured to the body 150.

The above mentioned embodiment is a preferred embodiment of the present disclosure, but the present disclosure is not limited to this, and may be modified in various ways without departing from the spirit and scope of the disclosure.

The present disclosure is particularly suitable for a cutting insert used for a high feed tool and the like, and a tool equipped therewith.

What is claimed is:

1. A cutting insert comprising:
an upper surface, which is a first end surface;
a lower surface, which is a surface on an opposite side to the upper surface, and is a second end surface having an installing surface for installing a cutting tool to a body;
a screw hole which has an axial line, which is a center axis of the cutting insert, penetrating from the upper surface to the lower surface;
a peripheral side surface which is formed such that the upper surface and the lower surface are connected;
a major cutting edge and an inner cutting edge which are formed in an intersecting region between the upper surface and the peripheral side surface, and an intersecting region between the lower surface and the peripheral side surface, respectively;
a constraining surface which is formed on the peripheral side surface so as to at least partially contact with the body; and
an R region which has a convex shape and is formed between the major cutting edge and the inner cutting edge at a position closer to the inner cutting edge than a first axial line perpendicular to and intersecting the center axis at a center point equidistant from the upper surface and the lower surface, and passing through a center of the peripheral side surface below the intersecting region between the upper surface and the peripheral side surface, wherein an inclination angle of a linear portion of the major cutting edge with respect to a second axial line perpendicular to and intersecting the center axis at the center point and perpendicular to the first axial line, and an inclination angle of the constraining surface with respect to the second axial line, are different in a top view viewed from the upper surface, the inclination angle of the major cutting edge is smaller than the inclination angle of the constraining surface, and a first virtual cross-section sectioned at a virtual surface, which is vertical to the installing surface of the lower surface and passes through the major cutting edge of the upper surface, is shaped such that the constraining surface is farther from the center axis of the cutting insert than a flank of the major cutting edge of the upper surface in a first direction along the first axial line by a first length difference, and an inner cutting edge of the lower surface is farther from the center axis of the cutting insert than the constraining surface in the first direction of the first axial line by a second length difference.

2. The cutting insert according to claim 1, wherein in the top view, the inner cutting edge of the lower surface is located farther from the second axial line than the major cutting edge of the upper surface.

3. The cutting insert according to claim 1, wherein the inclination angle of the major cutting edge and an inclination angle of the inner cutting edge with respect to the second axial line are different in the top view, and the inclination angle of the major cutting edge is smaller than the inclination angle of the inner cutting edge.

4. The cutting insert according to claim 3, wherein the inclination angle of the inner cutting edge and the inclination angle of the constraining surface are the same in the top view.

5. The cutting insert according to claim 1, wherein in a side view viewing the side surface on which the constraining surface is formed, the major cutting edge of the upper surface is formed at a height intersecting with an installing surface formed on the upper surface for installing a cutting tool to the body so as to be inclined with respect to the installing surface, and the inner cutting edge of the upper surface is formed at a lower position than the installing surface.

6. The cutting insert according to claim 1, wherein on the first virtual cross-section sectioned at the virtual surface which is vertical to the installing surface of the lower surface and passes through the major cutting edge of the upper surface, the flank of the major cutting edge is a surface of which a clearance angle is 0° or a negative value, and on a second virtual cross-section sectioned at a virtual surface which is vertical to the installing surface of the lower surface and passes through the inner cutting edge of the upper surface, a flank of the inner cutting edge is a positive surface of which a clearance angle is a positive value.

7. A cutting tool comprising:
a body which rotates around a rotation axis and includes an insert seat for holding a cutting insert; and the cutting insert according to claim 1, which is installed in the body such that the installing surface of the lower surface contacts with the insert seat.

\* \* \* \* \*